United States Patent
Julien et al.

(10) Patent No.: US 12,422,135 B2
(45) Date of Patent: Sep. 23, 2025

(54) VEHICLE LIGHTING SYSTEM HAVING ILLUMINATION CHARACTERISTICS THAT VARY BASED ON DETECTED OBJECT CLASS

(71) Applicant: Connaught Electronics Ltd., Tuam (IE)

(72) Inventors: Benjamin Julien, Tuam (IE); Mark Pattison, Tuam (IE); Amine Taleb-Bendiab, Tuam (IE); Brant Potter, Tuam (IE); Joshua Thaler, Tuam (IE); Sebastian Delling, Tuam (IE)

(73) Assignee: Connaught Electronics Ltd. (IE)

( * ) Notice: Subject to any disclaimer, the term of this patent is extended or adjusted under 35 U.S.C. 154(b) by 232 days.

(21) Appl. No.: 18/311,594

(22) Filed: May 3, 2023

(65) Prior Publication Data
US 2024/0369214 A1   Nov. 7, 2024

(51) Int. Cl.
*F21V 23/04* (2006.01)
*B60Q 1/02* (2006.01)

(52) U.S. Cl.
CPC ........... *F21V 23/0478* (2013.01); *B60Q 1/02* (2013.01)

(58) Field of Classification Search
CPC ...... F21V 14/003; F21V 3/06; F21V 23/0435; F21V 23/045; F21S 6/002; F21S 8/04
See application file for complete search history.

(56) References Cited

U.S. PATENT DOCUMENTS

| | | | |
|---|---|---|---|
| 9,975,472 B2 | 5/2018 | Wadell | |
| 10,538,195 B2 | 1/2020 | Fritz et al. | |
| 10,813,184 B2 | 10/2020 | Nelson et al. | |
| 10,907,802 B1 | 2/2021 | Pattison et al. | |
| 11,009,209 B2 | 5/2021 | Potter | |
| 11,293,619 B2 | 4/2022 | Potter et al. | |
| 11,435,225 B2 | 9/2022 | Nelson et al. | |
| 2018/0112846 A1* | 4/2018 | Jo | F21S 43/241 |
| 2018/0334099 A1* | 11/2018 | Gao | G06F 3/147 |
| 2022/0102583 A1* | 3/2022 | Baumheinrich | G02B 6/105 |
| 2022/0186903 A1 | 6/2022 | Potter et al. | |

FOREIGN PATENT DOCUMENTS

| | | | | |
|---|---|---|---|---|
| CN | 106134289 B | * | 8/2019 | ............. F21S 8/085 |
| WO | WO-2019064062 A1 | * | 4/2019 | ................ B60S 1/02 |
| WO | WO-2020157149 A1 | * | 8/2020 | ............. B60K 35/00 |

* cited by examiner

*Primary Examiner* — Abdullah A Riyami
*Assistant Examiner* — Syed M Kaiser
(74) *Attorney, Agent, or Firm* — Dickinson Wright PLLC

(57) ABSTRACT

A vehicle light system includes a plurality of light banks connected to a vehicle and configured to project light that radiates away from the vehicle. Each light bank includes a plurality of light sources. An image sensor, such as a camera, is connected to the vehicle and is configured to generate image data corresponding to a scene about the vehicle. A controller is connected to the light banks and the image sensor. The controller is configured to receive the image data, and execute an object detection machine learning model based on the image data to detect an object, determine a location of the object, and classify the detected object. The controller is configured to then select and dim one or more of the plurality of light sources based on the output of the object detection machine learning model. The dimming can vary based on the object class.

20 Claims, 7 Drawing Sheets

VEHICLE LIGHTING SYSTEM HAVING ILLUMINATION CHARACTERISTICS THAT VARY BASED ON DETECTED OBJECT CLASS

TECHNICAL FIELD

The present disclosure relates to a vehicle lighting system configured to detect an object(s), perform object classification to determine the object's class, (based on object type, location, orientation, distance and characteristics,) and control light sources based on the determined class(es).

BACKGROUND

Conventional vehicle lighting systems typically include forward facing light sources that can adjust in brightness (e.g., high beams, low beams), but are mainly static in position. In automotive settings, advances have been made in adaptive lighting systems that can block or turn off segments of the high-beam light in a specific area. In addition, low-beam light can be adjusted and/or increased in a specific direction, for example when turning around a corner. In agricultural settings, advances have also been made for illuminating 360 degrees about the vehicle, and manually turning off some of the lights to reduce reflectivity. For example, agricultural vehicles can have light systems that detect light from another external light source, and manually turn off one or more of the vehicle's lights corresponding to the direction of the external light source.

SUMMARY

According to one embodiment, an adaptive lighting system for a vehicle is provided. A plurality of light sources are connected to a vehicle and project light that radiates fully or partially around and away from the vehicle. One or more sensors are connected to the vehicle and configured to generate image data corresponding to a scene about the vehicle. A controller is communicatively connected to the light sources and the one or more sensors. The controller is configured to receive the image data generated by the one or more sensors; execute an object detection machine learning model on the image data to (i) detect an object in the image data, (ii) determine a relative location of the detected object, and (iii) classify the detected object to determine a class of the detected object; and selectively dim, at various dim levels, a selected one or more of the plurality of light sources. The selected one or more of the plurality of light sources is selected by the controller based upon the determined location and class of the detected object, and the controller is configured to selectively dim, at various dim levels, the selected one or more of the plurality of light sources by a magnitude depending on the determined class of the detected object.

According to another embodiment, an adaptive lighting system comprises a plurality of light sources configured to project light that radiates fully or partially around; a wireless transceiver configured to receive V2X data indicative of one or more objects; and a controller communicatively connected to the plurality of light sources and the wireless transceiver. The controller is configured to receive the V2X data from the wireless transceiver; based on the V2X data, determine a relative location of the one or more objects; based on the V2X data, determine a distance to the one or more objects; and dim a selected one or more of the plurality of light sources, wherein the selected one or more of the plurality of light sources is selected by the controller based upon the determined location of the one or more objects, and wherein the controller is configured to dim the selected one or more of the plurality of light sources by a magnitude depending on the determined distance to the one or more objects.

According to another embodiment, a method of controlling a lighting system comprises the following: lighting a plurality of light sources to project light that radiates away therefrom; receiving image data from an image sensor; determining a location of the object based on the image data; executing an object detection machine learning model on the image data to classify the object detected in the image data to determine a class of the detected object; and selecting one or more of the plurality of light sources for dimming based on the determined location of the object; and dimming the selected one or more of the plurality of light sources by a magnitude depending on the class of the detected object.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Figure 1:
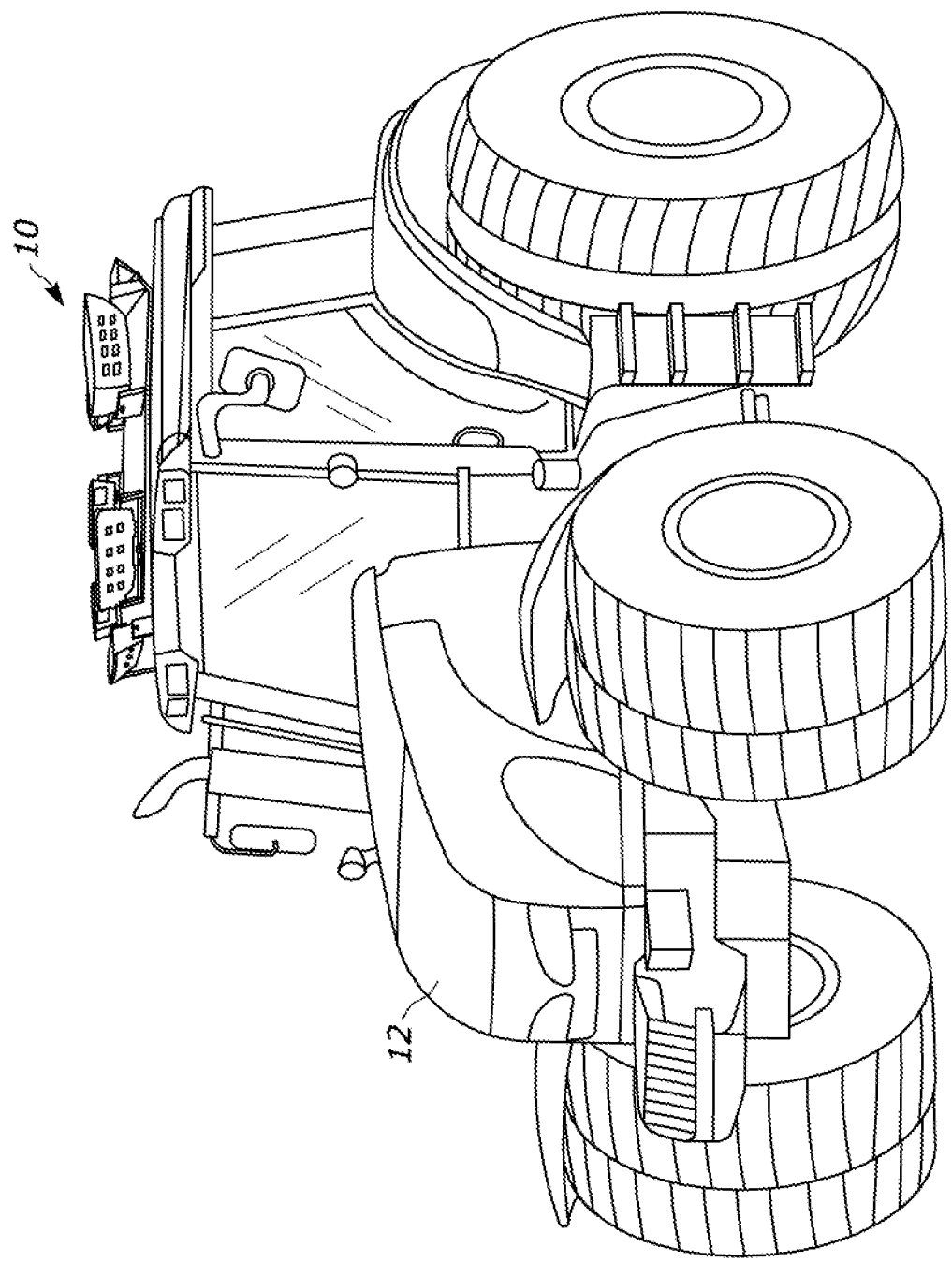
FIG. 1 is a perspective view of one example of a 360° segmented lighting source system in an agricultural vehicle in the form of a tractor.
Figure 2:
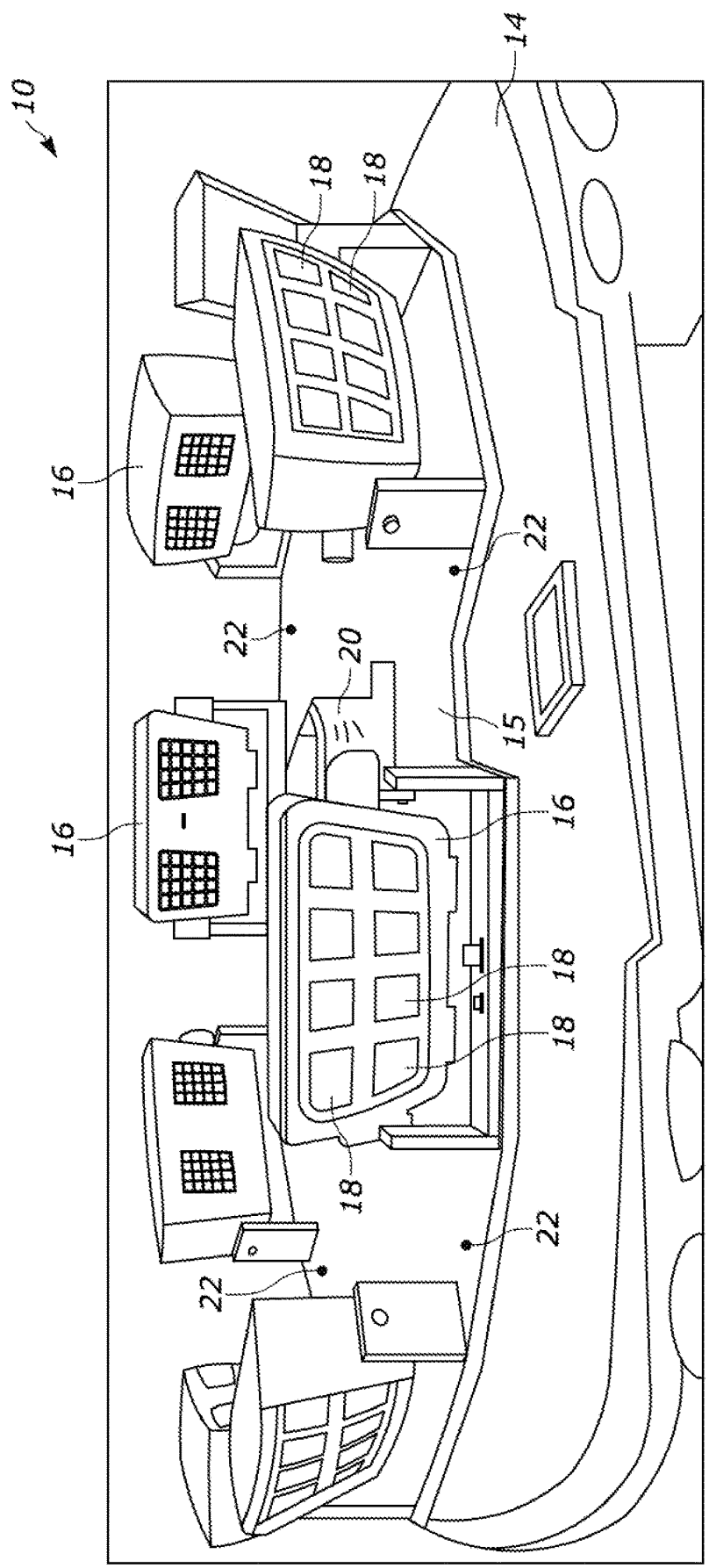
FIG. 2 is a perspective view of the lighting system of FIG. 1 shown installed on a roof of the agricultural vehicle.

FIGS. 1-2 show an exemplary embodiment of a vehicle lighting system 10 according to the present disclosure. The vehicle lighting system 10 is shown as an integral part of a vehicle 12 in FIG. 1, and is shown in more enlarged detail in FIG. 2 attached to a roof 14 of the vehicle 12. The vehicle 12 is shown in FIG. 1 as an agricultural vehicle, namely a tractor. But this is only an example. In other embodiments, the vehicle 12 is another agricultural vehicle such as a combine, grain cart, harvester, and the like. In other embodiments, the vehicle 12 is industrial equipment (e.g., front end loader, backhoe, excavator, dump truck, skid steer loader) or other commercial equipment (e.g., light structure, drone) that can operate at night or in the dark. In other embodiments, the vehicle 12 is an emergency vehicle, commercial vehicle, an industrial vehicle, drone (air or water), or a military vehicle. In yet other embodiments, the vehicle 12 is a passenger vehicle such as a car, truck, SUV, van, or the like. While not shown here, the vehicle lighting system 10 may be implemented in a bus, semi-truck, four-wheeler, dirt bike, autonomous vehicle, taxi, or combination thereof.

The vehicle lighting system 10 may be attached to a roof 14 of the vehicle, as shown in FIGS. 1-2. However, in other embodiments, the vehicle lighting system 10 is attached to the sides, front, and rear of the vehicle. The vehicle lighting system 10 may provide light that substantially surrounds or extends substantially around the vehicle 12 (e.g., 180 degrees or more, 270 degrees or more, or 360 degrees around the vehicle). The vehicle lighting system 10 may provide light so that 180 degrees or more, 225 degrees or more, 275 degrees or more, 315 degrees or more, 335 degrees or more, or 360 degrees around a vehicle is illuminated. This is true for both the horizontal and vertical directions. In other words, the vehicle lighting system 10 may provide light in these angles relative to a horizontal axis or a vertical axis; in some embodiments a spherical light is provided about the vehicle. The vehicle lighting system 10 may also be configured to work independent of other vehicle lighting systems on the vehicle, such as the low-beams, high-beams, fog lights, or other work lamps. In other words, the light sources and associated controller(s) can be segregated from the other vehicle light systems, and can be activated completely independent from those lighting systems. Alternatively, the vehicle lighting system 10 may be configured to complement these existing vehicle lighting systems. For example, the vehicle lighting system may utilize light sources and controllers (or portions thereof) that also provide lighting in other settings (e.g., low-beam, high-beam, etc.).

In the embodiment shown in FIGS. 1-2, the vehicle lighting system 10 provides light that illuminates 360 degrees around the vehicle 12. In particular, in the illustrated embodiment, the vehicle lighting system 10 includes a plurality of light sources 18. Each light source 18 may be connected directly to the vehicle roof 14, or indirectly connected to the vehicle roof 14 via a common mount 15, as is the case in FIG. 2, or mounted into a specific designated vehicle mount. The plurality of light sources may be grouped into light banks 16. The light sources 18 may be any type of lighting device that produces light such as an incandescent bulb, fluorescent light, compact fluorescent lamp, halogen lamp, light emitting diode (LED), infrared (IR), laser diode, high intensity discharge lamps (HID), halogen lights, xenon lights, chips within a diode module, any other light source, or a combination thereof. Each light source 18 may be a single lamp or bulb. Alternatively, each light source 18 includes a plurality of lamps, bulbs, diodes, chips, or a combination thereof. Each light source 18 may use a reflector or a collimator. Each light source 18 may be an array, and may include two or more, five or more, 10 or more, 20 or more, or even 50 or more sources that produce light and combine together to form a single light source 18. Each light bank 16 may include different types of light sources 18 such that some of the light sources are focused to illuminate different fields of distance from the vehicle (e.g., such as some focused to illuminate a near field, and some light sources are focused to illuminate a mid-field, and some light sources are focused to illuminate a far field).

The vehicle lighting system 10 also includes a controller 20 configured to control the light sources 18. Via the controller 20, the light sources can be turned on or off, and can be dimmed to a brightness intensity somewhere between 0-100% illumination. The controller 20 can also control the movement, direction, and/or position of the light banks 16 and/or each individual light source 18. The controller 20 can be located above the roof 14 of the vehicle 12 near the light banks 16. Alternatively, the controller 20 can be located at other parts within or surface-mounted to the vehicle 12, and can be integrated with, or in communication with, the vehicle's main electronic control unit (ECU) that operates various aspects of the vehicle outside of the vehicle lighting system 10.

The vehicle lighting system 10 also includes one or more image and/or position sensors 22. Each sensor 22 may include one or more video sensors, cameras, radar sensors, ultrasonic sensors, LiDAR sensors, and/or position sensors (e.g. GPS, vehicle to object communication (V2X)). One or more of the sensors can provide a 360-degree image. Each sensor 22 is configured to produce data that enables the controller 20 (or processor therein) to determine the presence of an object, the distance to the object relative to the sensor and/or the vehicle 12, and execute the machine learning models described herein such as object detection, object classification, and the like that are described in more detail below. Each sensor 22 can be mounted at any location about the vehicle 12 to enable generation of image data and detection of objects greater than 180 degrees, greater than 270 degree, and 360 degrees about the vehicle 12. The sensors 22 can be mounted to the mount 15 that connects the light banks 16 to the roof 14, and can be within a light bank 16, for example Large farming, agricultural, industrial or commercial heavy-duty equipment and vehicles with front (less than 180 degrees) lighting have sensors that detect nearby objects (or other light sources) for controlling the light sources on the vehicle. For example, systems have been proposed in which a vehicle lighting system has sensors that detect an external object, and a controller that turns off some of the vehicle's light sources to form a darkened tunnel of reduced/absent light formed in the direction of the object. This allows the detected object to not be blinded by the light sources. However, this darkened tunnel has illumination leakage (e.g., leakage from adjacent light sources that are not turned off), and can be too wide, especially in areas far removed from the vehicle. The darkened tunnel can also be too dark in the center. These issues can lead to difficulties in properly detecting objects in the tunnel.

Therefore, according to various embodiments disclosed herein, the vehicle lighting system 10 is configured to select one or more of the light sources 18 that illuminate a region corresponding to the location of the detected object, and dim (but not turn off) those selected light sources based on the object's class. Also, adjacent light sources can be dimmed to a different magnitude, thus providing a darkened tunnel that does not blind the detected object but improves the ability to properly detect the object. Moreover, the lighting system 10 has machine learning capabilities to execute objection detection and classification. Based upon the detected class of the object, the lighting system can adjust the dimming of the light sources. For example, if an object is detected and classified as another vehicle or person, the dimming of a selected light source may be to 10% maximum brightness and the dimming of adjacent light sources may be 25% maximum brightness. If, however, the object is detected and classified as a building, the dimming of the selected light source may be to 25% maximum brightness, and the dimming of adjacent light sources may be 50% maximum brightness. If, however, the object is detected and characterized as highly reflective, the dimming of the selected light source may be reduced to prevent reflective glare. For example, if the object is determined to be a highly-reflective color or coating (e.g., silver), then the system may dim the lighting significantly, but if the object has low-reflectivity (e.g., black), the amount of dimming may be less. The dimming can also be controlled based upon a determined distance the object is from the vehicle. Additional examples and embodiments are described further below.

Figure 3:
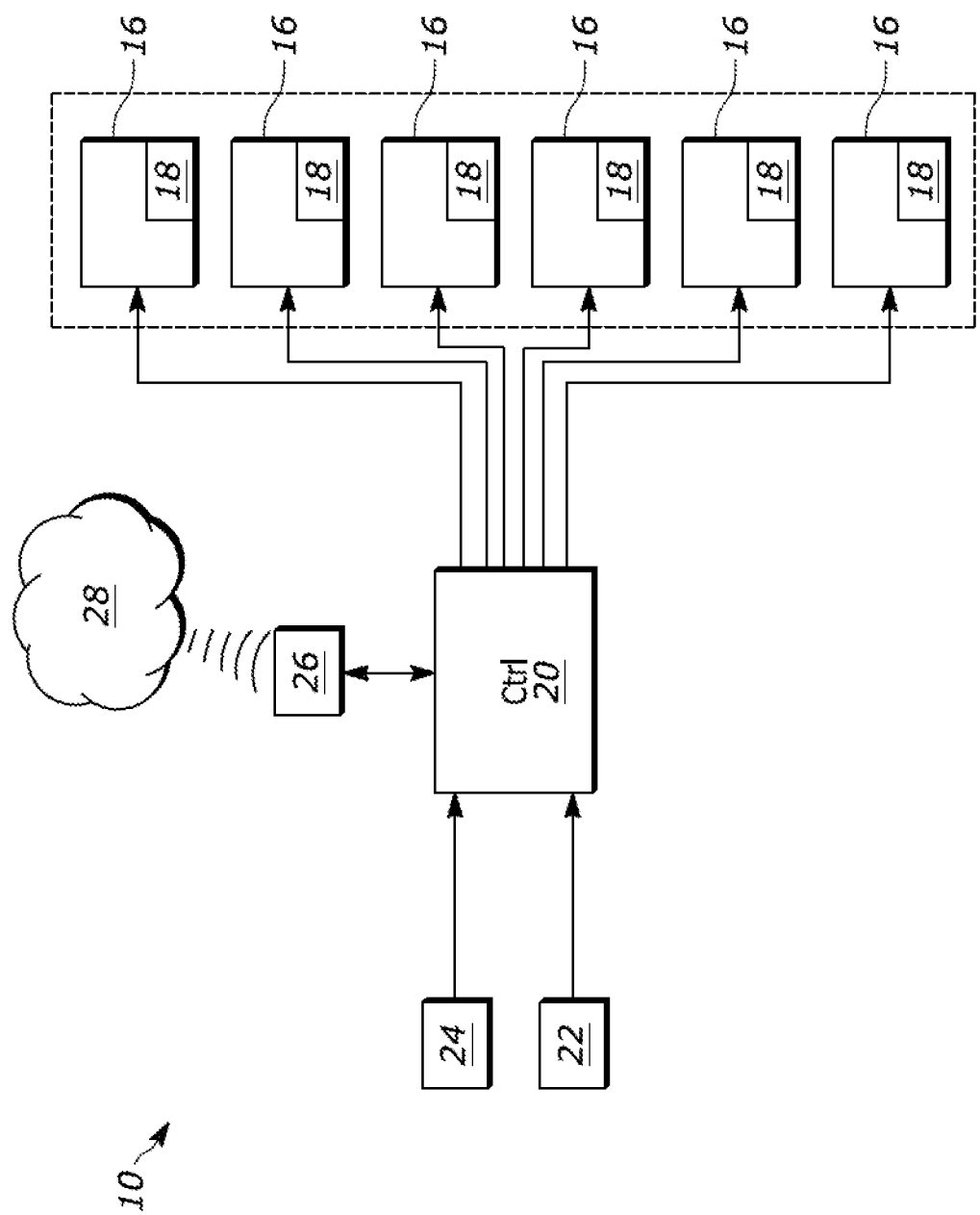
FIG. 3 is a block diagram of the light system, according to an embodiment.

FIG. 3 illustrates a schematic block diagram of the vehicle lighting system 10 for executing the various functions described herein. In order to determine the presence and location of an external object, and classify the object, the controller 20 is connected to various sensors 22. The sensors 22 can be of the type described above, such as video sensor (e.g., camera), radar, lidar, ultrasonic, etc. In the case of a single camera being provided, the sensor 22 can be a panorama or 360 degree camera arranged on the roof 14 of the vehicle. Alternatively, more than one camera can be provided such that the sensors 22 may be individual cameras mounted about various locations of the vehicle 12.

The controller 20 can also be connected to an input/output (I/O) interface 24. The I/O interface 24 is configured to provide digital and/or analog inputs and outputs. The I/O interface 24 can be used to facilitate the transfer of information between internal storage and processors of the controller 20 and external input and/or output devices (e.g., light sources, human-machine interface devices, etc.). The I/O interface 24 can include associated circuitry or BUS networks to transfer information to or between the processor(s) and storage. For example, the I/O interface 24 can include digital I/O logic lines which can be read or set by the processor(s), handshake lines to supervise data transfer via the I/O lines, timing and counting facilities, and other structures known to provide such functions. The I/O interface 24 can be referred to as an input interface (in that it transfers data from an external input, such as sensors 22) or an output interface (in that it transfers data to the controller 20 or transfers commands to an external device, such as light sources 18).

The controller 20 can be any controller capable of receiving information from sensors 22, processing the information, and outputting instructions to control the brightness of a selected one or more light sources, for example. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor(s), memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured to execute, via the processor, an object detection machine learning model that detects an object in the image data, classifies the object, determines the distance to the object, and other features explained herein. The computer-executable instructions may then be configured to execute, via the processor, control over the light sources based on the output of the object detection machine learning model.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory. Moreover, portable devices such as cell phones, tablets, laptop computers and wearable devices (e.g., smart watches) can be used to operate the systems disclosed herein, or allow personal settings to be recognized by the systems disclosed herein.

A computer program (also known as a program, software, software application, software stack, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

The image data deriving from the sensors 22 may be processed by the object detection machine learning model. The object detection machine learning model (also referred to as an object detection model) may be an object detection neural network. In other embodiments, the object detection model may be of another type, such as deep learning, etc. The object detection machine learning model may perform various processes such as object recognition, image classification, object localization, object segmentation, etc. for each of the input images and/or their associated image data. In short, the object detection machine learning model is configured to determine the presence of an object, and classify that object such as labeling the object as part of a particular class (e.g., vehicles (such as those listed above), buildings, people, animals, fences, and the like).

In one embodiment, the object detection neural network identifies sets of objects (e.g., an object identified by a bounding box) for each processed image and confidence scores associated with the identified objects. That is, the object detection machine learning model may identify a range (e.g., distribution) of confidence scores for each processed image, where each confidence score corresponds to an identified object from one of the processed images. Certain post processing and filtering algorithms may perform certain procedures to output detected objects. For example, the post processing and filtering algorithms may resize bounding boxes to original scale and filter confidence scores and associated objects.

The object detection model and its processes (e.g., object recognition, image classification, object segmentation, etc.) may be a pre-trained model. Alternatively, the object detection model and its processes may be trained by operating in a learning mode using a training dataset as input. The object detection model may be executed over a number of iterations using the data from the training dataset. With each iteration, the object detection model may update internal weighting factors based on the achieved results. For example, the object detection model can compare output results (e.g., a reconstructed or supplemented image, in the case where image data is the input) with those included in the training dataset. Since the training dataset includes the expected results, the object detection model can determine when performance is acceptable. After the object detection model achieves a predetermined performance level (e.g., at or near 100% agreement with the outcomes associated with the training dataset), or convergence, the object detection model may be executed using data that is not in the training dataset. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained object detection model may then be applied to new datasets to generate annotated data.

The object detection machine learning model may be trained with image augmentation techniques for better model training and image recognition/classification. For example, a test time augmentation technique may manipulate test images for a better trained image recognition model. Image manipulation techniques may include zooming, flipping, shifting, scaling, etc. Thus, a model may be trained using various versions of images from a limited set of training images. Further, when the trained model is being used for classifying/detecting a target image, the target image may be manipulated to provide a greater chance of success. Generated confidence scores associated with the various manipulations of the augmented image may be averaged to obtain a final score for the image or for identified objects within the image. In some cases, before the scores are averaged, bounding boxes or objects may be filtered from consideration based on the confidence scores. For example, confidence scores below a certain threshold may be removed from consideration, which may result in various objects not being identified. Further, training an image classification model using multiple augmented versions of the same image may require significant processing resources.

In some embodiments, the object detection model described herein is trained using the normalization and non-max suppression techniques. Accordingly, a set of training images may be manipulated and used to train the model such that the model is better equipped to detect or classify images and/or detect objects within images. In some cases, various input images may comprise images of objects such as vehicles (such as those listed above), people, animals, buildings, fences, and the like. The object detection model may then be trained on these images until convergence.

The controller 20 can also be connected to, or include, a wireless transceiver 26 configured to communicate with an off-board server 28, e.g. the cloud. The wireless transceiver 26 may be capable of establishing the wireless communications with the off-board server 28 via a cellular communication (e.g., vehicle-to-cloud (V2C), V2X, etc.) or any applicable wireless technology. The off-board server 28 can some or all of the processes of the object detection machine learning model. In one embodiment, the object detection machine learning model is trained off-board (e.g., not on the vehicle 12 itself) using the methods described above. The trained model can subsequently be sent to the controller 20 via the wireless transceiver 26 to allow the controller 20 to execute the functions of the trained model on-board the vehicle 12. Alternatively, the trained model can be located off-board, such that the image data (either raw or pre-processed) can be sent wirelessly to the off-board server 28, whereupon the off-board server 28 executes the object detection and classification models, and sends data or instructions back to the controller 20 for control of the light sources 18. The wireless transceiver 26 and associated communication also allows updates to the model to be made off-site and sent to the vehicle 12 via the transceiver 26. Additionally, data collected from the controller (e.g., detection of objects, classification of the objects) can be sent to the off-board server 28 for processing and updating of the model for use in other vehicles.

The embodiment illustrated in FIG. 3 shows the controller 20 in direct communication with the light banks 16. This is one embodiment in which each light bank 16 has its own controller or control mechanism for controlling the brightness of the light sources 18. Alternatively, the controller 20 can communicate directly with the individual light sources 18 for controlling the brightness.

Figure 4:
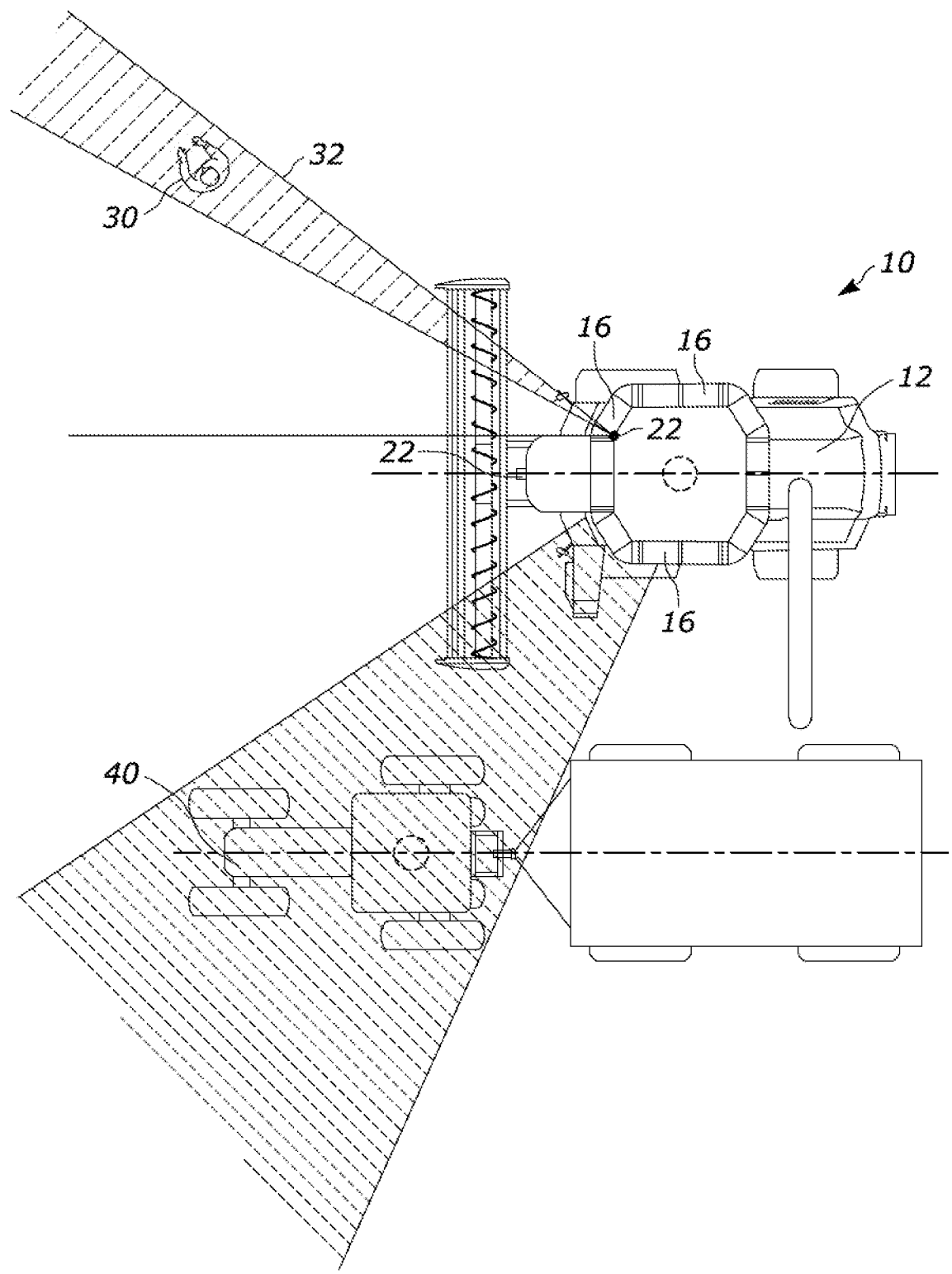
FIG. 4 is a schematic of an example lighting scene for the case of an agricultural vehicle in which the lighting system detects the location of another vehicle and a person, and using object class, the lighting system determines how and where light shadowing will be applied.

As mentioned above, based upon the determined class of the detected object, the controller 20 can select one or more of the light sources for dimming, as well as dim the selected light source(s) to a desired brightness. FIG. 4 illustrates an overhead schematic of use of the vehicle lighting system 10. Here, the vehicle 12 is a forage harvester instead of a tractor. The one or more sensors 22 have detected the presence of two objects, and the object detection machine learning model has classified these two objects as a person 30 and a tractor 40. These objects 30, 40 are shown together in FIG. 4 as existing simultaneously, however in other embodiments the objects 30, 40 are not detected at the same time. In other words, during operation of the vehicle 12 and its vehicle lighting system 10 in a first iteration, a person 30 may be detected and classified, while during a second operation of the vehicle 12 and its vehicle lighting system 10 in a second iteration, the tractor 40 is detected and classified.

Based on the determined class of the detected object, the controller 20 controls the light banks 16 accordingly. For example, the object detection machine learning model determines the presence of the person 30, and its relative location to the vehicle 12. Based on this information, the controller 20 can select one or more of the light sources of one or more light banks 16 to dim, creating a shadow or darkened region 32 that intersects the person 30. Every other light source other than the ones creating the darkened region 32 may be at full illumination, while the light source selected for creation of the darkened region 32 may be dimmed. Alternatively, as described further below, adjacent light sources can be dimmed to a brighter magnitude to reduce the darkened region behind the person 30.

Figure 5:
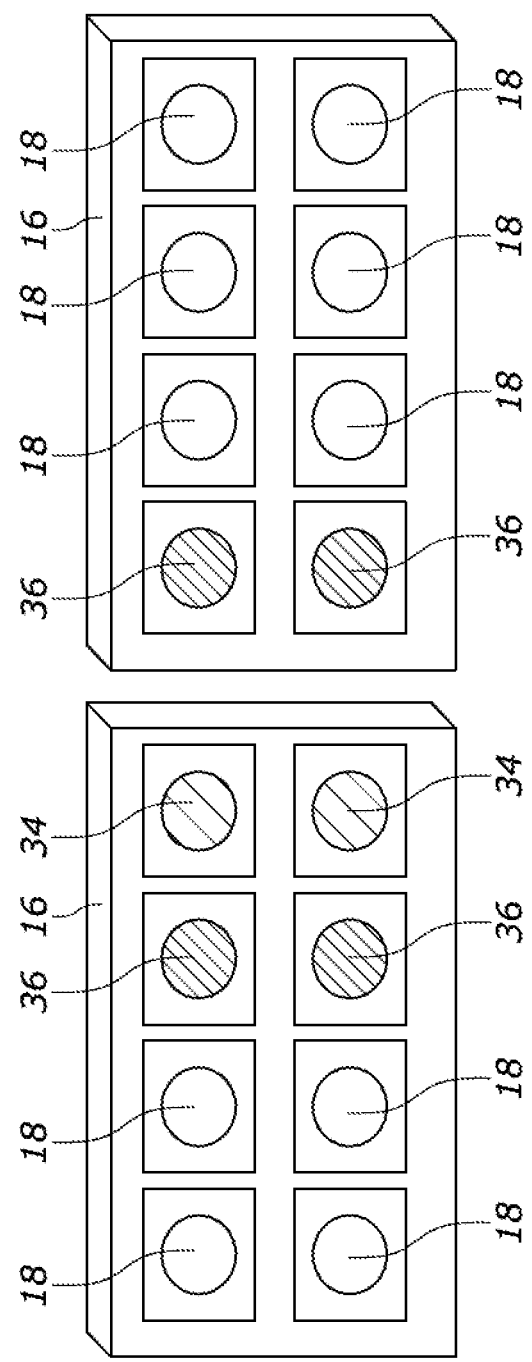
FIG. 5 illustrates multiple light sources according to an embodiment in which some of the light sources are on, four of the light sources are dimmed to a first intensity (e.g., 50% brightness), and two of the light sources are dimmed to a second intensity (e.g., 25% brightness).

Based on the object being a person (as opposed to a different class of object), the controller 20 may command the light sources to assume a first dimming pattern. FIG. 5 shows two adjacent light banks 16 controlled to create the darkened region 32. Here, each light bank 16 includes eight light sources 18. In this embodiment, the controller selects a first group of light sources 34 for dimming, wherein the selected first group of light sources 34 illuminate light in a direction of the person 30. The determined class of the object (e.g., person) may cause the controller 20 to dim the first group of light sources 34 to an intensity that is 25% of full brightness. The controller can then also select adjacent light sources 36 (i.e., a second group of light sources) for dimming to an intensity that is 50% of full brightness. The remainder of the light sources 18 can be of 100% brightness.

This dimming pattern can create a darkened region 32 that is specifically tailored for that detected object, in this case a person, so that the light delivered to that person is not so intense as to temporarily (and dangerously) blind the person, yet is bright enough to allow the object detection machine learning model to continue to accurately detect and classify the person as well as other objects that might appear in the darkened region 32.

Meanwhile, if the object detection machine learning model classifies the detected object as a tractor 40, the controller 20 can control the light banks differently. For example, again referring to FIG. 5, the selected light sources 34 are selected based on their illumination of light in a direction of the tractor 40. The controller 20 can then dim the selected light sources 34 to a different intensity than if the object were a person. For example, the controller 20 can dim the selected light sources to 40% of full brightness, and dim the adjacent light sources 36 to 60% of full brightness. This creates a darkened region 42 that is brighter than darkened region 32.

The ability for the controller 20 to control adjacent light sources 18, 34, 36 to assume different brightness magnitudes can also help in specifically controlling the size, shape, and characteristics of the darkened regions 32, 42. If the darkened regions or tunnels 32, 42 are created by simply dimming one or more of the corresponding light sources to a single specific brightness magnitude, the tunnels 32, 42 are left with minimal control. Dimming of light sources adjacent to the light sources that create the tunnels 32, 42 can add to the control the size and shape of the tunnels 32, 42. For example, referring to FIG. 4, assume the darkened tunnel 32 is created by dimming a group of light sources to one particular brightness magnitude. This might create a stark contrast in brightness magnitude between the darkened tunnel 32 and the surrounding light outside of the tunnel 32. By controlling adjacent light sources to a different brightness, the stark line between the darkened tunnel 32 and the area outside of the darkened tunnel 32 can be softened. Also, the adjacent lighting can help to illuminate the area behind the detected object (in this case, person 30) due to their relative angle to the detected object.

The particular pattern of dimming on the light banks 16 should not be limited to the embodiments shown or described herein, unless otherwise noted. Rather, the dimming pattern commanded by the controller 20 can be customized by the user. For example, the selected light sources 34 for dimming can be dimmed anywhere between 0 and 100% of brightness (e.g., 2%, 5%, 10% 20%, 25%, 50%, 75%, etc. of full brightness). Likewise, the adjacent light sources 36 that are adjacent to the selected light sources 34 can be dimmed anywhere between 0 and 100% of brightness. In one embodiment, the adjacent light sources 36 are not dimmed as much as (e.g., are brighter than) the selected light sources 34.

Furthermore, dimming of adjacent light sources is only an example and the present disclosure is not necessarily limited to include such feature. For example, a selected one or more light sources 18 may be selected as the light source for which dimming will occur. That selected one or more light sources 18 may be selected based on the location of the object, and the amount of dimming of the one or more light sources 18 may be commanded based on the class of that object as determined by the object detection machine learning model. The selected one or more light sources 18 may all be dimmed to the same or similar brightness, while all other light sources remain at full brightness.

It should also be understood that the selection of a particular light source for dimming may only be in a single light bank 16, contrary to the embodiment illustrated in FIG. 5 in which multiple light banks 16 are used to create the darkened region.

Also, in the embodiment of FIG. 5, the light sources 34 for dimming are vertically aligned. However, that is not necessary. In another example, only one of the light sources is selected for dimming, and a light source adjacent to that selected light source is not dimmed, or is dimmed to a different intensity. Additionally, light sources 18 and banks 16 may be stacked in a single or multiple row and column configuration.

Figure 6:
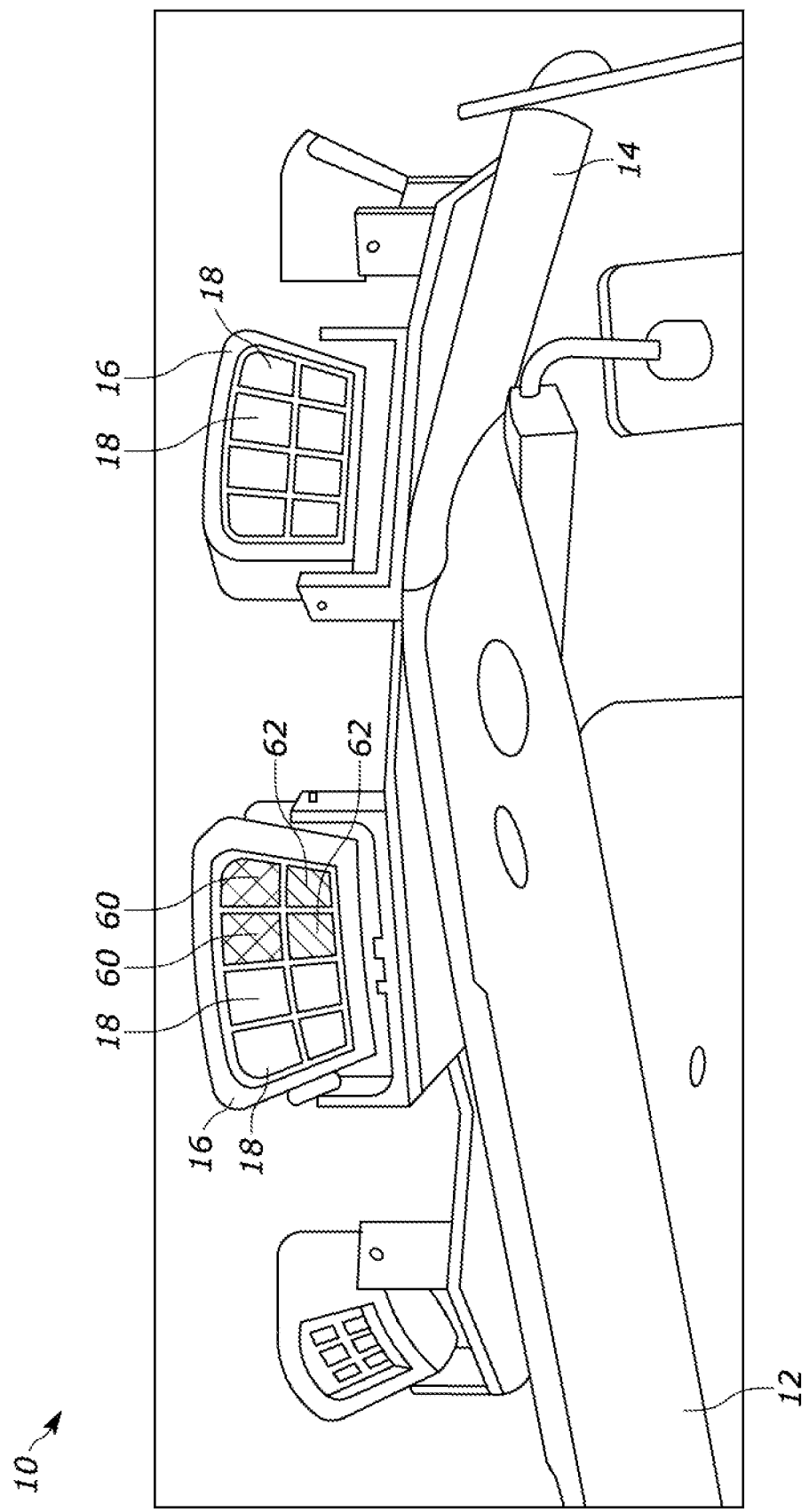
FIG. 6 is a lower perspective view of an example of the lighting system wherein some of the light sources are on, some of the light sources are off, and some of the light sources are dimmed, depending on the presence of a detected object, and its class according to an embodiment.

FIG. 6 highlights an embodiment of a different lighting pattern. In this embodiment, only the light sources 18 of a single light bank 16 are dimmed. Here, a first group of light sources 60 are selected to be turned completely off, and a second group of light sources 62 are selected to be dimmed to an amount between 0-100% of brightness. In this embodiment, the first group of light sources 60 includes two horizontally-adjacent light sources, and the second group of light sources 62 includes two horizontally-adjacent light sources that are vertically adjacent to the first group of light sources 60.

Additionally, more or less than the four adjacent lights can be dimmed to a different brightness magnitude than the selected first group of light sources 34. In other words, the number of adjacent light sources that are dimmed to a different level can be more or less than four. Moreover, the number of adjacent light sources that are dimmed can vary based on the determined class of the object. For example, the controller 20 can be configured to alter the brightness of the light sources based on a particular detected class of object such that the a selected one of the light sources is dimmed to a first magnitude, a second light source directly adjacent to the selected light source is dimmed to a second magnitude brighter than the first, and a third light source directly adjacent to the second light source is dimmed to a third magnitude that is brighter than the second. In other words, the light sources can fade from bright to dark in the direction of the selected light source that is the darkest.

The controller 20 can also change the dimming pattern of the light sources 18 based on the determined distance to the detected object. For example, if the object is determined to be a first distance away, a first number of light sources can be selected for dimming; if the object is determined to be a second distance away, a second number of light sources can be selected for dimming, wherein the second number of light sources is different than the first number of light sources. Moreover, the number of adjacent lights adjacent to the selected light(s) can be adjusted based on the distance. The controller 20 can also change the dimming brightness based on the distance. For example, the brightness of the selected light source can be dimmed to a magnitude if the object is determined to be at the first distance away, and the brightness of the selected light source can be dimmed to a different magnitude if the object is determined to be a second distance away. This allows a customizable size, shape, and brightness of the darkened regions 32, 42 for a particular class of object.

Figure 7:
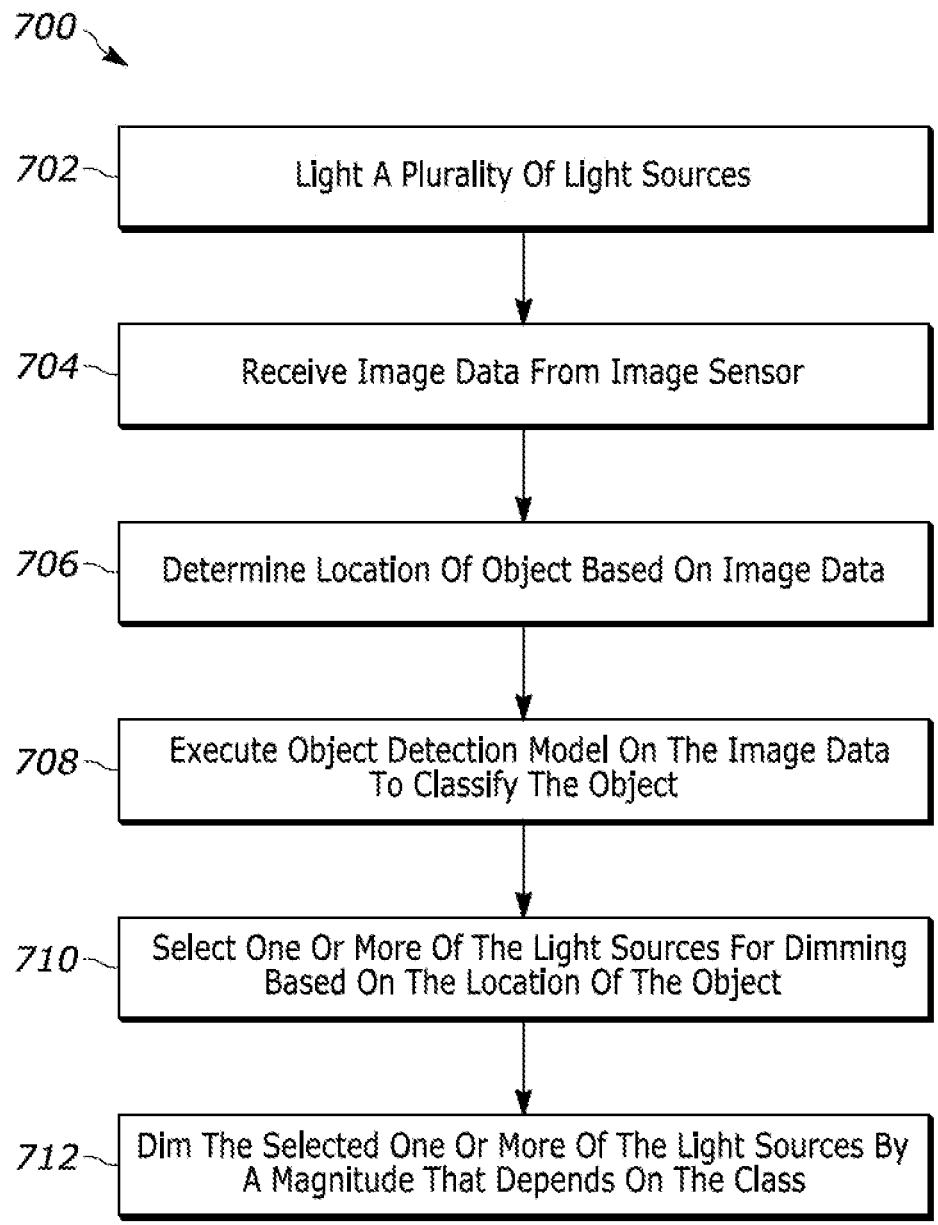
FIG. 7 is a flowchart of a method of controlling a lighting system, according to one embodiment.

FIG. 7 illustrates a flowchart 700 of a method of controlling a lighting system according to one embodiment. The method 700 can be implemented using the structure explained in this disclosure. For example, one or more processors can execute the method 700. At 702, a plurality of light sources are lit. At 704, image data is received from an image sensor. At 706, the location of the object is determined based on the image data. At 708, an object detection model is executed on the image data to classify the object. At 710, one or more of the light sources is selected for dimming based on the location of the object. And, at 712, the selected one or more of the light sources is/are dimmed by a magnitude that depends on the class. Of course, additional functions may be provided in this method 700, such as adjusting the dimming based on the determined reflectiveness of the object, and the like.

While the lighting system disclosed herein is referenced as a vehicle lighting system, the inventive concepts disclosed herein are not necessarily limited to vehicular applications. For example, the lighting systems disclosed herein can be placed on not only vehicles, but other structures (e.g., buildings, homes, etc.) and can be implemented into roadside units (RSUs), and the like.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An adaptive lighting system for a vehicle, the adaptive light system comprising:
   a plurality of light sources connected to a vehicle and projecting light that radiates fully or partially around and away from the vehicle;
   one or more sensors connected to the vehicle and configured to generate image data corresponding to a scene about the vehicle; and
   a controller communicatively connected to the light sources and the one or more sensors, wherein the controller is configured to:
   receive the image data generated by the one or more sensors;
   execute an object detection machine learning model on the image data to (i) detect an object in the image data, (ii) determine a relative location of the detected object, and (iii) classify the detected object to determine a class of the detected object; and
   selectively dim, at various dim levels, a selected one or more of the plurality of light sources, wherein the selected one or more of the plurality of light sources is selected by the controller based upon the determined location and class of the detected object, and wherein the controller is configured to selectively dim, at various dim levels, the selected one or more of the plurality of light sources by a magnitude depending on the determined class of the detected object.

2. The adaptive lighting system of claim 1, wherein the controller is configured to dim the one or more of the plurality of light sources to (i) a first light intensity based on the detected object being of a first class, and to (ii) a second light intensity based on the detected object being of a second class.

3. The adaptive lighting system of claim 1, wherein the magnitude of dimming is less than 100 percent of maximum illumination.

4. The adaptive lighting system of claim 1, wherein the selected one or more of the plurality of light sources includes a first group of light sources and a second group of light sources, wherein the controller dims the first group to a first brightness, and the controller dims the second group to a second brightness different than the first group.

5. The adaptive lighting system of claim 1, wherein the controller is configured to execute the object detection machine learning model on the image data to determine a distance to the detected object, wherein the magnitude of dimming is based on the distance.

6. The adaptive lighting system of claim 1, wherein the plurality of light sources includes (i) a first light source that creates a tunnel of darkened light, and (ii) a second light source adjacent to the first light source;
wherein the controller is configured to dim the first light source to a first brightness, and dim the second light source to a second brightness brighter than the first brightness to alter the tunnel created by the first light source.

7. The adaptive lighting system of claim 1, wherein the one or more sensors includes at least one of a camera, lidar sensor, radar sensor, ultrasonic sensor, GPS sensor, and V2X sensor.

8. The adaptive lighting system of claim 1, further comprising a wireless transceiver configured to receive V2X data indicative of one or more objects about the vehicle including the detected object;
wherein the controller is further configured to select the one or more of the plurality of light sources for dimming based on the V2X data.

9. The adaptive lighting system of claim 1,
wherein the controller is further configured to process the image data to estimate an amount of light reflecting off the object, and adjust the magnitude of dimming of the selected one or more of the plurality of light sources based on the estimated amount of light reflecting off the object.

10. An adaptive lighting system comprising:
a plurality of light sources configured to project light that radiates fully or partially around;
a wireless transceiver configured to receive V2X data indicative of one or more objects; and
a controller communicatively connected to the plurality of light sources and the wireless transceiver, wherein the controller is configured to:
receive the V2X data from the wireless transceiver;
based on the V2X data, determine a relative location of the one or more objects;
based on the V2X data, determine a distance to the one or more objects; and
dim a selected one or more of the plurality of light sources, wherein the selected one or more of the plurality of light sources is selected by the controller based upon the determined location of the one or more objects, and wherein the controller is configured to dim the selected one or more of the plurality of light sources by a magnitude depending on the determined distance to the one or more objects.

11. The adaptive lighting system of claim 10, further comprising one or more image sensors configured to generate image data corresponding to a scene about the vehicle;
wherein the controller is further configured to execute an object detection machine learning model on the image data to (i) detect one of the one or more objects and (ii) classify the detected object to determine a class of the detected object;
wherein the controller is further configured to adjust the magnitude of dimming of the selected one or more of the plurality of light sources based on the determined class of the detected object.

12. The adaptive lighting system of claim 11, wherein the controller is configured to dim the one or more of the plurality of light sources to (i) a first light intensity based on the detected object being of a first class, and to (ii) a second light intensity based on the detected object being of a second class.

13. The adaptive lighting system of claim 10, wherein the magnitude of dimming is between 0 and 99 percent of maximum illumination.

14. The adaptive lighting system of claim 10, wherein the selected one or more of the plurality of light sources includes a first group of light sources and a second group of light sources, wherein the controller dims the first group to a first brightness, and the controller dims the second group to a second brightness different than the first group.

15. The adaptive lighting system of claim 10, wherein the plurality of light sources includes (i) a first light source that creates a zone of darkened light, and (ii) a second light source adjacent to the first light source;
wherein the controller is configured to dim the first light source to a first brightness, and dim the second light source to a second brightness brighter than the first brightness to alter the zone of darkened light created by the first light source.

16. A method of controlling a lighting system, the method comprising:
lighting a plurality of light sources to project light that radiates away therefrom;
receiving image data from an image sensor;
determining a location of the object based on the image data;
executing an object detection machine learning model on the image data to classify the object detected in the image data to determine a class of the detected object; and
selecting one or more of the plurality of light sources for dimming based on the determined location of the object; and
dimming the selected one or more of the plurality of light sources by a magnitude depending on the class of the detected object.

17. The method of claim 16, further comprising:
receiving V2X data indicative of one or more objects including the detected object; and
selecting the one or more of the light sources for dimming based on the V2X data.

18. The method of claim 16, wherein the plurality of light sources includes a first light source that creates a zone of darkened light, and a second light source adjacent to the first light source;

wherein the dimming includes dimming the first light source to a first brightness, and dimming the second light source to a second brightness brighter than the first brightness to alter the zone of darkened light created by the first light source.

19. The method of claim 18, wherein the plurality of light sources includes a third light source adjacent the first light source on an opposite side of the first light source from the second light source;
   wherein the dimming includes dimming the third light source to a third brightness brighter than the first brightness to alter the darkened tunnel created by the first light source.

20. The method of claim 16, further comprising:
   executing the object detection machine learning model on the image data to determine a class and orientation the detected object;
   wherein the magnitude of dimming is based on the class and orientation.

* * * * *